United States Patent Office 3,386,918
Patented June 4, 1968

3,386,918
HIGH TEMPERATURE DIELECTRIC
REINFORCED COMPOSITE
Ralph L. Hough, Springfield, and Herbert S. Schwartz,
Trotwood, Ohio, assignors to the United States of America as represented by the Secretary of the Air Force
No Drawing. Filed Oct. 6, 1965, Ser. No. 493,586
2 Claims. (Cl. 252—63.5)

ABSTRACT OF THE DISCLOSURE

Composition of matter comprising a low modulus boron nitride matrix firmly bonding together a multiplicity of high modulus aluminum oxide whiskers by a process comprising the steps of compacting crystalline aluminum oxide whiskers into a mat of desired configuration and dimensions and then impregnating the mat with a boron nitride vapor under a pressure of 0.01 mm. to 10 mm. of mercury at a temperature maintained of 800° C. to 1500° C.

---

The invention described herein may be manufactured and used by and for the United States Government for governmental purposes without the payment to us of any royalty thereon.

The present invention relates to novel composite reinforced dielectric material having superior high temperature mechanical and electrical characteristics. More specifically the invention relates to a composition of matter comprising a low modulus boron nitride as a matrix having dispersed therein as reinforcement a multiplicity of high modulus aluminum oxide whiskers.

The advent of supersonic vehicles such as aircraft, missiles, rockets and the like, has created a demand for materials of construction characterized by high mechanical strength and unimpaired electromagnetic transparency at the high temperatures generated at the speeds of such supersonic vehicles.

In the past, radomes and similar housings for microwave apparatus have been comprised, generally, of reinforced plastic material and, more particularly, of fiber glass reinforced plastics.

At the temperatures encountered at supersonic speeds, such prior art materials in the form of radomes or other reinforced structures tend to lose their structural strength and integrity and, due to the carbonization of the materials cause a general degradation of the plastic materials.

It has been found that the above mentioned and related disadvantages of the prior art materials have been greatly reduced by the use of the reinforced high temperature dielectric composition of the present invention.

The invention provides solutions to two important problem areas: (a) the need for high strength electrical insulators wherever very high temperatures are involved; and (b) the need for suitable radome material in space vehicles and especially those subjected to high temperatures as, for example, during reentry maneuvers.

The present invention provides a radome material that is suitable for use at temperatures up to at least 3,500° F., which is 1,927° C. The material is an oxidation resistant structural dielectric of dependable performance up to at least 3,500° F. The materials of the present invention perform in a manner that is superior to the fiber glass reinforced plastics that have preceded it and which plastics tend to carbonize and to lose strength and dielectric properties at elevated temperatures. At elevated temperatures, the fiber glass reinforced plastics become electrically conductive and can not successfully be used in radar and other forms of communication. The use of sapphire needles as a radome material is expensive and is not available in a wide variety of sizes and configurations.

The materials disclosed in this invention are suitable for fabricating practically any configuration of required high temperature dielectric bodies. The material disclosed in the present invention as a novel reinforced composite dielectric material, retains its electromagnetic transparency and mechanical integrity at temperatures far in excess of previously known dielectric materials used interchangeably therewith.

The composition of matter that is disclosed herein comprises a boron nitride matrix through which is dispersed aluminum oxide whiskers of sapphire crystalline structure.

In making a radome or other object, a multiplicity of aluminum oxide sapphire whiskers are formed as a mat in the desired shape. Boron nitride is then deposited by vapor plating throughout the aluminum oxide whiskers in their matted condition until a matrix is produced. Vapor plating methods that are suitable for this operation are described in a series of patents to Kenneth M. Taylor, of which U.S. Patent No. 3,058,809, issued Oct. 16, 1962, may be taken as being illustrative. Vacuum metallizing, chemical vapor plating, and the like, are suitable for this purpose with preference given to the latter method. Where preferred, a laminated structure is produced by forming a thin whisker mat impregnated with boron nitride to which more whiskers are applied with subsequent impregnation to form the laminated structure. Where preferred, the whisker mat may be the full thickness of the finished body and may be impregnated with boron nitride as an entity.

Illustrative process for producing boron nitride vapor may use a vapor phase chemical reactor wherein a boron halide reacts with vaporous ammonia or with a similar mixture of nitrogen and hydrogen; pentaborane is caused to react with a suitable hydrazine in the production of boron nitride in its vapor state; or a borazine vapor such as b-trichloroborazine is caused to undergo thermal decomposition in the provision of boron nitride vapor.

Illustratively, the alumina whisker mat is heated from 800° C. to 1,500° C. The alumina whisker mat is positioned within an enclosure within which the pressure may be maintained at from 0.01 mm. mercury to 10 mm. mercury with or without the addition of an inert gas, such as argon, and with or without the addition of hydrogen or nitrogen as carrier gases for conducting vapors of b-trichloroborazine within the temperature range of 800° C. to 1,500° C. during which boron nitride vapor is caused to completely impregnate the alumina whisker mat as a matrix. Preferably the vapors are caused to flow through the whisker mat at a uniform temperature. Where desired, the temperature may be graduated within the stipulated range adapted for a particularly desirable result in conjunction with the gas flow pattern. The end result is a nonporous reinforced composite body.

The resultant material is a mat of $Al_2O_3$ whiskers impregnated with boron nitride of the composition BN.

The process is:

(1) Reacting $BHa_3 + NH_3 \rightarrow BN + 3HHa$ wherein Ha represents a halogen.

(2) Reacting pentaborane with a suitable hydrazine, such as $4B_5H_9 + 10RNHNH_2 \rightarrow 20BN$ wherein R is a radical of methane, ethane, phenyl, benzyl, etc.

(3) Decomposing a borazine with heat, as by reacting $B_3N_3H_6 + heat \rightarrow 3BN + 3H_2$, or by reacting

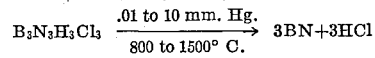

$$B_3N_3H_3Cl_3 \xrightarrow[800 \text{ to } 1500° \text{ C.}]{.01 \text{ to } 10 \text{ mm. Hg.}} 3BN + 3HCl$$

It is to be understood that the reactants, the reagents, the temperatures and the pressures that are disclosed herein are illustrative of a successful reduction to practice of the present invention and that modifications may be made therein without departing from the spirit and the scope of the present invention.

We claim:
1. A process of making a high strength nonporous di- electric radome composition comprising compacting crystalline aluminum oxide whiskers into a mat, and then impregnating said mat so made with trichloroborazine vapors about at a pressure of 0.01 mm. to 10 mm. of mercury within the temperature range of 800° C. to 1500° C. by flowing the vapors through the whisker mat to form by decomposition of said vapors a boron nitride matrix in which the aluminum oxide whiskers are dispersed.

2. The product made by the process defined by claim 1.

References Cited

UNITED STATES PATENTS

| 2,745,763 | 5/1956 | Ueltz | 106—65 |
| 3,058,809 | 10/1962 | Taylor | 23—191 |
| 3,178,308 | 3/1965 | Oxley et al. | 117—106 |

LEON D. ROSDOL, *Primary Examiner.*

J. D. WELSH, *Assistant Examiner.*